United States Patent
Iceland et al.

[11] 3,780,258
[45] Dec. 18, 1973

[54] ALTERNATING CURRENT ARC POWER SOURCE HAVING OPPOSITE POLARITY IGNITION PULSE

[75] Inventors: William F. Iceland, Los Alamitos; Joseph W. Cuzzupoli, El Toro, both of Calif.

[73] Assignee: Air Products and Chemicals, Inc., Allentown, Pa.

[22] Filed: June 17, 1971

[21] Appl. No.: 154,114

[52] U.S. Cl. .............. 219/131 R, 219/135, 315/171, 315/172, 315/173, 315/277
[51] Int. Cl. ............................................. B23k 9/10
[58] Field of Search ...................... 219/135, 131; 315/171, 172, 173, 277

[56] References Cited
UNITED STATES PATENTS

| | | | |
|---|---|---|---|
| 3,637,974 | 1/1972 | Tajbl et al. | 219/135 |
| 2,784,349 | 3/1957 | Anderson | 219/135 |
| 3,609,290 | 9/1971 | Lawrence | 219/131 R |
| 2,629,071 | 2/1953 | Anderson | 219/131 R X |
| 3,328,637 | 6/1967 | Aldenhoff | 315/277 |
| 3,309,567 | 3/1967 | Flieder et al. | 315/173 X |
| 2,558,102 | 6/1951 | Roberts | 315/173 X |
| 2,399,415 | 4/1946 | White | 315/173 X |

Primary Examiner—C. L. Albritton
Assistant Examiner—George A. Montanye
Attorney—James C. Simmons

[57] ABSTRACT

An alternating current arc welding having an alternating voltage power source for feeding energy to the welding arc and having a means for coupling, in series with the power source, a relatively high voltage impulse during the time the alternating voltage increases in absolute value so that the arc is re-ignited at the same phase angle during each half cycle.

6 Claims, 3 Drawing Figures

INVENTORS
WILLIAM F. ICELAND
JOSEPH W. CUZZUPOLI

ATTORNEY

ALTERNATING CURRENT ARC POWER SOURCE HAVING OPPOSITE POLARITY IGNITION PULSE

FIELD OF INVENTION

This invention relates to a device for arc welding by means of alternating current (AC) having a source of alternating voltage on which is superimposed an impulse voltage.

BACKGROUND OF THE INVENTION

Welding arcs have been established with either alternating or direct currents depending on the particular work requirements. Such arcs may employ a consumable or a non-consumable electrode. The power source for the non-consumable electrode should be of the constant current variety. Although AC power has well known advantages on some materials which DC power does not have, AC arcs are extinguished every time the arc current reverses itself and passes through zero. Then the arc must re-ignite itself, which experience shows does not always happen in each half cycle. The prior art teaches many methods to ensure proper re-ignition of the arc; for example, as shown in U.S. Pat. Nos. 2,891,196 and 3,328,637. These patents teach that a voltage impulse source be placed in parallel with the welding power source and, therefore, across the arc. The impulse source is synchronized with the welding's power source so that the higher voltage impulse re-ignites the arc at the proper time. Since the impulse voltage is also applied across the welding power source, some of the impulse energy is inherently shunted therethrough causing a loss in power.

SUMMARY OF THE INVENTION

The present invention employs a capacitance pulse source connected in series with the AC welding power source and welding arc. The pulse source or circuit employs a silicon controlled rectifier (SCR) in series with a pulse capacitor and a high frequency transformer and employs a means to trigger the SCR to provide a controlled discharge of the energy stored in a capacitor across the arc gap through the high frequency transformer. The capacitor is charged by a DC source that, preferably, is produced by rectifying the AC. A uni-junction timing circuit is employed to fire the SCR. The timing circuit is coupled across the same AC welding power source and in parallel with the welding arc so that the firing of the SCR is accurately synchronized with the alternating welding current.

OBJECT OF THE INVENTION

An object of the invention is to provide a more efficient, low cost, reliable, and simpler stabilized AC welding power source.

Another object of this invention is to provide an impulse circuit that is coupled in series with both the AC welding power and the welding arc.

Another object is to provide a relatively high voltage impulse that is synchronized with the AC welding power to re-ignite the arc.

These and other objects and features of advantage shall become more apparent after studying the following detailed description of the drawings.

DETAILED DESCRIPTION OF THE DRAWINGS

Figure 1:
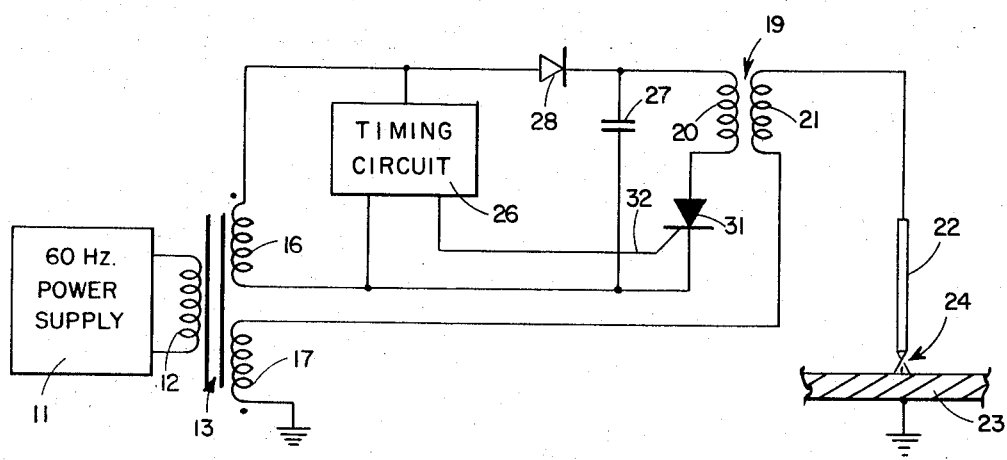
FIG. 1 is a block diagram of the novel circuit.

Referring to FIG. 1, a suitable 60 Hz (cycle per second) AC power supply 11 is connected to a primary coil 12 of a transformer 13 that has two secondary coils 16 and 17. The two secondary coils 16 and 17 are coupled 180° out of phase as shown by the usual "dot convention" for reasons that will be explained hereinafter. The secondary coil 17 is connected in series with another transformer 19, in particular, with the secondary coil 21 thereof, a welding electrode 22, and a workpiece 23 forming a welding arc gap 24. Of course, if required, an inert gas shield may be formed around the arc by means well known in the art (not shown). The other secondary coil 16 has coupled thereacross a timing circuit 26, in parallel with an impulse capacitor 27 and diode 28. The diode 28 prevents current from flowing back from the capacitor 27 to the transformer 13. Across, or in parallel with, the capacitor 27 is connected a series circuit including an impulse SCR 31 and a primary coil 20 of the transformer 19. A control lead 32 of the SCR 31 is coupled to the timing circuit 26. Due to the phase relationship between the secondary coils 16 and 17, as denoted by the dot convention When capacitor 27 is charging, current flows through the arc gap 24 from the workpiece 23 to the electrode 22. The arc ignites itself more readily when the current is flowing in this direction than when the current reverses. After the welding voltage passes through zero so that the workpiece 23 is made negative, relative to the electrode 22, the timing circuit places a positive potential on lead 32 to fire or turn on SCR 31 causing the capacitor to rapidly discharge through the primary coil 20 of the transformer 19. A relatively high voltage impulse is induced in the secondary coil 21 to place a relatively high voltage across the gap 24 to ignite the arc.

Figure 2:
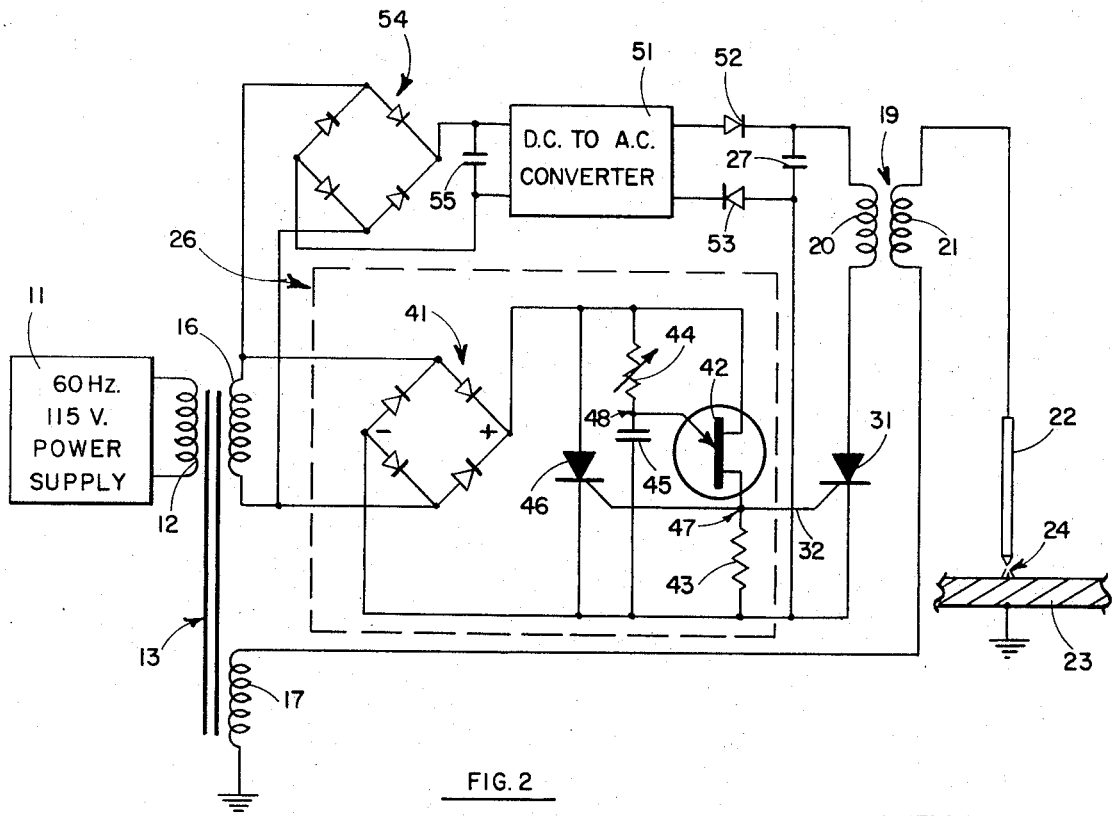
FIG. 2 is a schematic of one embodiment of the novel circuit.

Referring to FIG. 2, there is a diagram of a schematic of one embodiment of the apparatus shown in FIG. 1 wherein like numerals refer to elements having similar function. The timing circuit 26 is shown as a uni-junction timing circuit except that this circuit 26 is made inherently synchronized to the AC power supply 11 to produce a positive impulse 120 times per second. This is accomplished by providing a standard full wave bridge rectifier 41 to produce a pulsating current that diminishes to zero value 120 times a second. This pulsating current is coupled across the following parallel circuits: (1) a uni-junction transistor 42 series connected to a resistor 43; (2) potentiometer 44 series connected with a timing capacitor 45; and (3) a timing shunt SCR 46. The first base of the uni-junction transistor 42 is connected to the positive side of the bridge rectifier 41 while the other base is connected to the resistor 43 forming a junction 47 to which the control lead 32 of SCR 31 is connected as well as the control lead of SCR 46. Now, when the uni-junction transistor 42 is fired on, the junction 47 is made positive to turn on the impulse triggering SCR 31, as before, and also the shunt SCR 46. The uni-junction transistor 42 is able to conduct because its emitter is connected to a junction 48 formed by the potentiometer 44 and the timing capacitor 45 which junction becomes more positive as the capacitor 45 receives more charge. One understands that the charging rate of the capacitor 45 is depended upon the resistance value of the potentiometer 44 and, also, the value of the applied voltage. The function of the timing shunt SCR 46 is to discharge to capacitor 45 and to bypass the current in the remaining portion of the particular pulse. The SCR 46 turns off when the current of the particular pulse from the bridge drops to zero and SCR 46 stays off since the uni-junction transistor has also been turned off placing terminal 47 at ground potential when terminal 48 was grounded by SCR 46. The impulse capacitor 27 in this embodiment is fully charged before it is discharged by the timing circuit 26 regardless of the relative phase angle between the time the uni-junction transistor 42 is fired on and the frequency of the power supply 11. The impulse capacitor 27 is charged to a value of, for example, 450 volts by a conventional DC to AC converter 51 which converts direct current to a relatively high frequency (10,000 Hz) of at least 10 times greater than the A.C. welding power supply. Double diodes 52 and 53 are employed between a converter 51 and a capacitor 27 to charge the capacitor 27 in a proper direction. The DC from the converter is obtained from another full-wave rectifying bridge 54 and a filter circuit represented by a filter capacity 55. AC is coupled to the bridge 54 from the secondary coil 16. In this embodiment the impulse capacitor 27 is discharged 120 times a second and, in so discharging, places a relatively high potential across the electrode 22 and workpiece 23. In addition, this high potential always places the electrode 22 at a negative potential with respect to the workpiece rather than the workpiece negative with respect to the electrode. Therefore, during one half cycle of the welding current, the impulse voltage aids the welding voltage and, during reverse cycle, the impulse voltage is bucked by the welding voltage. It has been found that the relatively high voltage impulse ignites the arc and, since the welding potential appears across the arc gap 24 before the arc can extinguish itself, the arc is maintained. This result is accomplished because the phase angle between the impulse voltage and the welding voltage is adjustable by the potentiometer 44 and the impulse voltage can be timed to be coupled across the arc gap 24 when the voltage is at an absolute value greater than zero and is rising. The SCR 31 turns off when capacitor 27 is discharged because the apparent short circuit across capacitor 27 draws all the current from the converter 51 and the current through SCR 31 is insufficient to keep it conducting.

Figure 3:
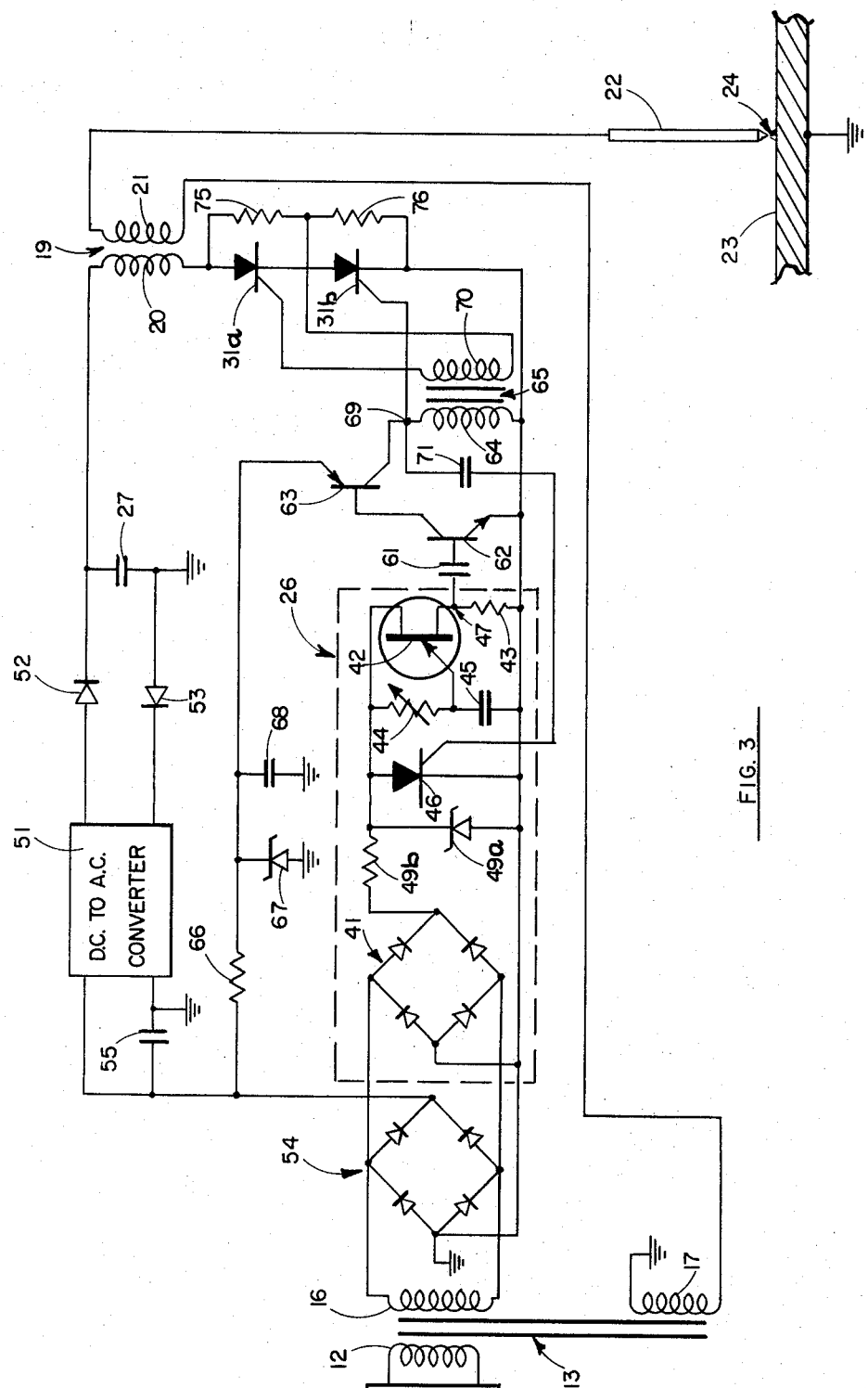
FIG. 3 is a schematic of another embodiment of the novel circuit.

Referring to FIG. 3, another embodiment of the invention is shown which gives better control in arc stabilization and allows one to use presently available elements, such as SCRs 31a and 31b which are connected in series to perform the function of the one SCR 31 of FIG. 2. Due to the relatively high voltage across the capacitor 27, two present state of the art SCRs are needed in series becuase the presently available SCRs break down when relatively low potentials are applied thereacross. Again, like numerals refer to elements having similar functions. The SCRs 31a and 31b are turned on as before by the timing circuit 26. However, in FIG. 3 the timing circuit 26 includes a Zener diode 49a and a resistor 49b whose functions are to limit the potential applied across the potentiometer 44 and the timing capacitor 45. The discrete pulses in a pulsating current, instead of being shaped as a half a sine wave, are shaped by the Zener diode 49a more like square waves to cause the voltage across the capacitor to rise linerally with time. Therefore, since the positive voltage signal at terminal 47, when uni-junction transistor 40 fires on, is now at a much lower value than in the embodiment of FIG. 2, this voltage signal is coupled by a DC blocking capacitor 61 to the base of an NPN transistor 62 whose collector is connected to the base of PNP transistor 63, the emitter of transistor 62 being grounded. Transistor 63 has its collector connected to the primary coil 64 of a transformer 65 and its emitter connected to the positive lead from the bridge rectifier 54 through a voltage dropping resistor 66. To the junction of resistor 66 and transistor 63 is connected a Zener diode 67 and a capacitor 68 which are both grounded to provide a more stabilized potential to the amplifier. When the transistor 63 is turned on by the firing of the uni-junction transistor 42, a junction 69, formed by the primary coil 64 and transistor 63, goes positive. This positive signal is coupled by a lead to SCR 31b and by inductance to the secondary coil 70 of transformer 65. Coil 70 places a positive signal on a control lead of SCR 31a to turn it on at the same time SCR 31b is turned on. Simultaneously, the positive signal from junction 69 is coupled by capacitor 71 to turn on SCR 46. Relatively high value resistors 75 and 76 across the SCRs 31a and 31b, respectively, are used to discharge the capacitor 27 when the welder is turned off.

Other embodiments may now become apparent to one skilled in the art after studying these teachings. Therefore, the invention is not limited to the specific embodiments illustrated but includes all embodiments within the scope of the claims.

What is claimed is:

1. An arc current supply system for establishing and maintaining an alternating current arc across an arc gap formed by an electrode and a workpiece, said system comprising:
   an electrode and a workpiece positioned for arc welding;
   first means for providing an alternating current to said electrode and to said workpiece to establish an arc therebetween; and
   second means for applying a voltage impulse in series with said first means during at least a portion of the alternating current cycle when said electrode is positive relative to the workpiece, said applied voltage impulse being opposite in polarity to and substantially larger than the voltage of said first means.

2. The system of claim 1 wherein:
   said second means includes means for timing said voltage impulse in synchronization with the alternating frequency of said first means so that said voltage impulse occurs when the voltage provided by the first means to the arc is increasing.

3. The system of claim 2 wherein:
   said second means includes a first capacitor,
   third means for charging said first capacitor to a given potential,
   an SCR connected to said first capacitor,
   a transformer having its primary coil connected in series with said first capacitor and said SCR, and having its secondary winding connected in series with said first means providing alternating current to said electrode and said workpiece, and wherein said means for timing includes means being coupled to said SCR for turning on said SCR at timed intervals to thereby periodically discharge said first capacitor to provide a voltage impulse to said arc during a portion of the period when said alternating current supplied to said electrode is positive relative to said workpiece.

4. The system of claim 3 wherein said second means includes:

a power supply providing a pulsation at least twice the frequency of said alternating current, a resistor and second capacitor series timing circuit connected to be charged by said pulsating power supply, a second SCR connected in circuit with said resistor and said second capacitor in said timing circuit, and means for causing both said SCRs to conduct and thus discharge both said capacitors at least twice each cycle of said alternating current upon said second capacitor reaching a predetermined voltage.

5. The system of claim 4 wherein:

said third means for charging said first capacitor is of the high frequency AC type having a frequency of at least ten times greater than the frequency of said alternating current, and rectifying means in circuit with said high frequency source and said first capacitor.

6. An arc current supply system for establishing and maintaining an alternating current arc across an arc gap formed by an electrode and a workpiece, said system comprising:

an electrode and a workpiece positioned for arc welding;

a transformer having at least first and second secondary windings, means for providing an alternating current to said transformer, said first secondary winding connected to provide alternating current to said electrode and said workpiece, means connected to said second secondary winding for providing an impulse in series with the alternating current output of said first secondary winding, said impulse being applied when said alternating current supplied to said electrode is positive relative to said workpiece, said applied impulse being opposite in polarity to said alternating current and of a magnitude sufficient to reignite the arc.

* * * * *